(12) United States Patent
Quast et al.

(10) Patent No.: US 8,141,953 B2
(45) Date of Patent: Mar. 27, 2012

(54) ADJUSTING SYSTEM FOR A VEHICLE SEAT

(75) Inventors: Ingo Quast, Coburg (DE); Marco Gleissberg, Geringswalde (DE)

(73) Assignee: Brose Fahrzeugteile GmbH & Co., Coburg (DE)

( * ) Notice: Subject to any disclaimer, the term of this patent is extended or adjusted under 35 U.S.C. 154(b) by 71 days.

(21) Appl. No.: 12/276,749

(22) Filed: Nov. 24, 2008

(65) Prior Publication Data

US 2009/0134681 A1    May 28, 2009

(30) Foreign Application Priority Data

Nov. 27, 2007   (DE) .................... 20 2007 016 550 U

(51) Int. Cl.
*B60N 2/07*   (2006.01)
*B60N 2/02*   (2006.01)
(52) U.S. Cl. ...................... 297/341; 248/429; 296/65.01
(58) Field of Classification Search .................. 297/341; 548/429, 424, 430; 248/429, 424, 430; 296/65.1, 296/68.1
See application file for complete search history.

(56) References Cited

U.S. PATENT DOCUMENTS

| 5,855,349 | A | * | 1/1999 | Nini et al. | 248/429 |
| 6,048,030 | A | * | 4/2000 | Kanda et al. | 297/341 |
| 7,195,303 | B2 | * | 3/2007 | Nihonmatsu et al. | 296/65.13 |
| 7,300,091 | B2 | * | 11/2007 | Nihonmatsu et al. | 296/65.13 |
| 7,600,802 | B2 | * | 10/2009 | Kojima | 296/65.13 |
| 2003/0075963 | A1 | * | 4/2003 | Oberbeck | 297/344.1 |

FOREIGN PATENT DOCUMENTS

| DE | 19921786 | 11/1999 |
| DE | 20 2004 011 388 | 12/2005 |

* cited by examiner

*Primary Examiner* — Sarah B McPartlin
(74) *Attorney, Agent, or Firm* — Scott T. Weingaertner; Joseph D. Eng, Jr.; King & Spalding LLP

(57) ABSTRACT

An adjusting system for a vehicle seat is specified that comprises a lower rail that can be mounted rigidly to the vehicle, an upper rail that is displaceable along the lower rail and can be mounted rigidly to the seat, a locking device for locking the upper rail to the lower rail, a memory module that is movable along the lower rail and can be fixed alternately with respect to the seat or to the vehicle and which includes a movable blocking catch for effecting positive locking to the lower rail, and a seat-mounted control lever for actuating the blocking catch and a seat-mounted actuating means for unlocking the locking device.

12 Claims, 3 Drawing Sheets

ADJUSTING SYSTEM FOR A VEHICLE SEAT

FIELD OF THE INVENTION

The invention relates to an adjusting system for a vehicle seat.

BACKGROUND OF THE INVENTION

An adjusting system of this type is known from DE 20 2004 011 388 U1 and comprises a lower rail that can be mounted rigidly to the vehicle and an upper rail that can be mounted to the vehicle seat and that is displaceable along the lower rail. The displaceability of the upper rail along the lower rail makes possible adjustment of the vehicle seat connected to the upper rail in the longitudinal direction of the rails. For fixing of the upper rail in a desired adjustment position with respect to the lower rail, a locking device for locking the upper rail to the lower rail is provided. The adjusting system further comprises a memory module fixed alternately with respect to the seat or to the vehicle, which has a movable blocking catch for forming a positive lock with the lower rail. A control lever mounted firmly to the seat is also provided for actuating the blocking catch. Finally, the adjusting system also includes an actuating means, mounted firmly to the seat, for unlocking the locking device.

The memory module is used for mechanically storing a set longitudinal seat position if the vehicle seat has to be temporarily adjusted longitudinally. Such a temporary longitudinal adjustment of a vehicle seat is necessary, for example in two-door passenger cars or in minibuses, in order to facilitate entry and egress for a passenger in the rear of the vehicle.

For storing the set longitudinal seat position, the seat-mounted control lever is coupled to an actuating mechanism for temporarily displacing the vehicle seat longitudinally, such as an entry or egress mechanism. If the vehicle seat is displaced longitudinally for entry or egress, the control lever is moved from its locking or latching position which it forms with the memory module, whereby the memory module is uncoupled from the vehicle seat. At the same time, the blocking catch of the memory module is actuated in order to form a positive lock with the lower rail. In other words, in the event of a temporary longitudinal displacement of the vehicle seat, the memory module is stopped in a fixed position on the lower rail. By means of the stopped position of the memory module on the lower rail, the preset longitudinal seat position is stored. According to DE 20 2004 011 388 U1, the mechanism for folding the backrest of the vehicle seat is used as the actuating mechanism which triggers stopping of the memory module.

Furthermore, a similar adjusting system is known from DE 20 2006 005 103 U1, although the respective memory modules differ from one another in detail.

If the vehicle seat is pushed back again after stoppage of the memory module, the control lever, through suitable shaping, again forms a positive lock with the memory module at the stopped position and unlocks the positive lock between the blocking catch and the lower rail. The vehicle seat has again reached its original position.

According to DE 20 2004 011 388 U1 and DE 20 2006 005 103 U1, the blocking catch of the memory module is substantially in the form of a rotary lock which, upon suitable actuation, forms a positive lock with the recesses of the lower rail. For this purpose, the blocking catch engages either by means of blocking lugs in openings of the lower rail, or receives the bridges of the lower rail located between the openings in a correspondingly formed recess.

According to DE 20 2004 011 388 U1, the actuating mechanism for temporary longitudinal displacement of the vehicle seat, for example the mechanism for folding the backrest, is connected to the seat-mounted actuating means for unlocking the locking device. This is because, in a set longitudinal seat position, the upper rail is locked to the lower rail by means of the locking device, so that the vehicle seat would not be displaceable.

SUMMARY OF THE INVENTION

It is the object of the invention to specify an adjusting system of the type mentioned in the introduction which is further improved with respect to the known adjusting systems of the prior art.

This object is achieved according to the invention for an adjusting system of the type mentioned in the introduction in that a blocking lever is provided which is mounted firmly to the seat and engages in a position-dependent manner with the actuating means, and in that the memory module has a control cam for controlling the blocking lever such that, in a position of the memory module in which it is fixed with respect to the vehicle, the operating means is blocked in an unlocking position by the blocking lever.

In this regard, the invention is based on the consideration that, after stoppage of the memory module on the lower rail, renewed locking between the upper rail and the lower rail should not occur independently of the actuating mechanism which triggers stoppage of the memory module. In particular, such undesired locking after stoppage of the memory module independently of an inclined position of the backrest is to be avoided, if the mechanism for folding the backrest of the vehicle seat is used as the actuating mechanism which triggers stoppage of the memory module.

Such undesired locking during a temporary longitudinal displacement of the vehicle seat after stoppage of the memory module represents a significant restriction of convenience during operation of the vehicle seat for rapid entry or egress. The sequence of movements for a person boarding or alighting is not inconsiderably obstructed by the locking of the vehicle seat to the lower rail.

It is also known from the prior art mentioned in the introduction to provide a catch for latching the folded backrest to the base of a vehicle seat, the catch being released by means of a corresponding comfort lever only as the lever runs up on the stopped memory module. However, such a catch is unable to prevent locking between the upper rail and the lower rail independently of the inclination of the backrest after stoppage of the memory module.

Undesired locking between the upper rail and the lower rail after stoppage of the memory module can, however, be reliably avoided if a seat-mounted blocking lever is provided which engages with the actuating means in a position-dependent manner and which is controlled by a suitable control cam of the memory module. For this purpose, the blocking lever is configured in cooperation with the control cam in such a manner that in a fixed position of the memory module with respect to the vehicle, in which the blocking lever is free and is not coupled to the memory module, the actuating means is blocked in an unlocking position by the blocking lever.

In other words, the actuating means which causes unlocking of the locking device after stoppage of the memory module is blocked by the free blocking lever in a position which causes unlocking. Only as the blocking lever runs up the control cam of the stopped memory module is the actuating means released again, so that the upper rail can again be locked to the lower rail in the desired position by means of the locking device. Through this configuration, therefore, it is ensured that, independently of the position of the actuating mechanism for temporary longitudinal displacement of the seat, no locking between the upper and lower rails can be effected.

The invention offers the further advantage that, in relation to the known adjusting systems which already have a comfort lever for unlocking the catch for latching a folded backrest to a seat base, only a single lever, namely the comfort lever, must be exchanged and replaced by the blocking lever which causes blocking of the actuating means. In this case the blocking lever can also, in particular, take over the function of the comfort lever, that is, the blocking lever can both effect blocking of the actuating means in the free state and effect unlocking of a catch between the backrest and the seat base in the state in which said blocking lever has run up on the memory module.

In principle, the blocking of the actuating means by the free blocking lever, when it is not interacting with the stopped memory module, can be implemented by means of mechanical coupling means familiar to the person skilled in the art. These may be latching means, blocking catches or other releasable mechanical catches. Moreover, the actuating means does not necessarily have to be connected to the mechanism for folding the backrest of the vehicle seat. The actuating means for unlocking the locking device may equally well be connected to another actuating mechanism which makes possible simple and rapid temporary longitudinal displacement of the vehicle seat.

Preferably, however, the actuating means is couplable to a backrest adjusting device. For, in order to permit rapid entry and egress, it has proved advantageous to couple the folding forward of the backrest simultaneously to a longitudinal displacement, in order to provide sufficient room for a boarding or alighting person as quickly as possible. A Bowden cable, which represents a mechanically stable and simple form of connection, is especially suitable for the coupling to a backrest adjusting device.

In an advantageous configuration of the adjusting system, a free end of the blocking lever is guided along the control cam of the memory module under preload. Secure guidance of the blocking lever with respect to the control cam is thereby effected. In addition, a relatively large travel difference between the free blocking lever and the blocking lever guided on the control cam of the memory module can be achieved through the preload, which in turn is favorable for blocking the actuating means, or releasing same, in a transition of the blocking lever between its free position and the position guided on the control cam.

Also preferably, the actuating means includes a rotary element which effects the unlocking of the locking device in a position rotated out from the rest position. Such a rotary element requires only small installation space, as compared to an actuating means which is guided linearly. Moreover, no additional installation space is required for the movement of a rotary element.

Advantageously, the rotary element includes a first coupling means and the blocking lever a second coupling means, the first and second coupling means being coupled to one another in the rotated-out position of the rotary element while the blocking lever is free, and the coupling means being uncoupled when the blocking lever runs up on the control cam of the memory module. When the entry or egress function of the vehicle seat is activated, the actuating means or the rotary element is moved to unlock the locking device. In particular, the rotary element is then in the rotated-out position. After stoppage of the memory module, which is effected by the actuating mechanism of the vehicle seat by means of the control lever, the seat-mounted blocking lever is free and is no longer coupled to the control cam of the memory module. If a coupling of the two coupling means now takes place in these positions of the rotary element and of the blocking lever, undesired locking of the upper rail to the lower rail after stoppage of the memory module is reliably avoided. In the rotated-out position which causes unlocking of the locking device, the rotary element is coupled firmly to the blocking lever and thereby fixed. If the blocking lever runs up on the stopped memory module, the position of the blocking lever is changed, which is utilized for uncoupling the two coupling means with respect to one another. In other words, upon stoppage of the memory module the actuating means is fixed in a rotational position which causes unlocking of the locking device and is released again when the blocking lever runs up on the memory module.

In a simple and reliable configuration, the first coupling means is advantageously formed on the rotary element as a radially outwardly oriented catch hook with a radial retaining flank, and the second coupling means is advantageously formed on the blocking lever by an axial projection which abuts against the catch hook. As this happens the projection engages behind the catch hook in the rotated-out position of the rotary element and is retained by the retaining flank. When the blocking lever runs up on the control cam of the memory module, the projection moves radially outwards along the retaining flank beyond the radial extension of the catch hook, whereby the catch hook, and therefore the rotary element, are finally released. With this configuration, an already existing preload of the blocking lever in the direction of the memory module can at the same time be ideally utilized for latching of the projection and for running up along the radially outwardly-directed catch hook. After stoppage of the memory module, the projection of the blocking lever is in a position located further inwards radially, with respect to the axis of rotation of the rotary element, and therefore blocks a rotation of the actuating means configured as a rotary element by abutting against the retaining flank. Upon running up on the stopped memory module, the blocking lever is raised by the control cam, whereby the projection moves radially outwards along the retaining flank and finally releases the catch hook and therefore the rotary element.

Ideally, a preloading of the locking device against the actuating means can be utilized to provide a preloading of the catch hook against the projection. Alternatively, the actuating means may act against the projection by means of spring force via the catch hook.

In order to achieve a mechanically stable, simple configuration which requires only small installation space, it is appropriate to mount the blocking lever and the rotary element on a common spindle.

In that case, the blocking lever advantageously has a bearing region with a slot receiving the spindle and further includes a first lever arm interacting with the control cam of the memory module and a second lever arm angled therefrom as a bracing element. By means of this configuration, firstly, the blocking lever is securely guided on the spindle by means of the slot. Nevertheless, sufficient relative movement exists between the blocking lever and the rotary element, which movement is used to allow coupling or uncoupling between the coupling means on the rotary element and on the blocking lever upon corresponding actuation by the control cam. If the relative movement of the blocking lever is such that the slot moves with respect to the spindle, the angled second lever arm is used as a bracing element. Secure, stable and defined guidance of the blocking lever on the spindle is thereby ensured.

The actuating means may be coupled to the locking device in various ways. For example, mechanical coupling means, in particular a Bowden cable, may be provided. In an especially simple configuration, the actuating means further includes an actuating lever for unlocking the locking device. In this case this actuating lever may be the same lever which is utilized manually by a seated person to adjust the seat longitudinally by unlocking the locking device.

In order to actuate an actuating lever, it is further preferred that the rotary element be configured as a rotatably mounted rocker, a free end of which rests against the actuating lever. The other free end of the rocker is coupled, for example by means of a Bowden cable, to the actuating mechanism for temporary longitudinal displacement of the vehicle seat, and in particular to a backrest adjusting device.

For reliable release of the actuating lever, which causes unlocking of the locking device, the actuating lever is advantageously preloaded against the free end of the rocker.

DETAILED DESCRIPTION OF THE INVENTION

Figure 1:
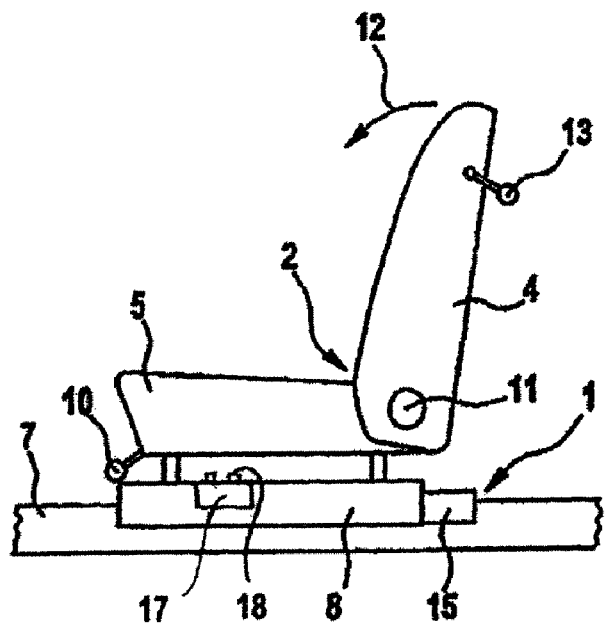
FIG. 1 shows schematically a vehicle seat with an "easy entry" function.

In order to clarify an "easy entry" function, FIG. 1 shows schematically an adjusting system 1 with a vehicle seat 2 which includes a backrest 4 and a seat base 5. The adjusting system 1 is formed from a lower rail 7 mounted rigidly to the vehicle, along which slides an upper rail 8 with the vehicle seat 2 mounted thereon. The upper rail 8, and therefore the vehicle seat 2, can be locked or blocked to the lower rail 7 at different longitudinal positions of the seat by means of a locking device 17.

In order to obtain a desired longitudinal seat position, the vehicle seat 2 has an actuating lever 10 arranged on the seat base 5, which lever 10, upon actuation, causes unlocking of the locking device 17 between the upper and lower rails 8, 7. After unlocking, the vehicle seat 2 with the upper rail 8 can be moved along the lower rail 7 to a desired longitudinal seat position and fixed in that position by releasing of the actuating lever 10, causing renewed locking of the upper rail 8 to the lower rail 7.

The locking device 17 is formed by the provision of a certain number of movable pins 18 which lock the upper and lower rails 8, 7 to one another by means of corresponding openings thereon. The pins 18 are raised by means of the actuating lever 10, whereby the locking between the upper rail 8 and lower rail 7 is released.

The backrest 4 is connected rotatably to the seat base 5 by means of a fastening spindle 11. In particular, the backrest 4 can be folded forwards towards the seat base 5 in the direction of the arrow 12 by means of the fastening spindle 11. In other words, the vehicle seat 2 illustrated has a backrest adjusting device. An actuating lever 13 is provided to release the actuating mechanism for folding the backrest 4.

Furthermore, in order to store a preset longitudinal seat position a memory module 15 is associated with the upper rail 8, which memory module 15 slides along the lower rail 7 jointly with the upper rail 8 fixed to the seat during a regular longitudinal displacement of the seat. To implement an "easy entry" function of the vehicle seat 2, the backrest 4 is connected mechanically both to the locking device 17 which effects the locking between the upper and lower rails 8, 7, and to a trigger mechanism for stopping the memory module 15 on the lower rail 7. If the actuating lever 13 is triggered and, as a result, the backrest 4 is folded forwards in the direction of the arrow 12 towards the seat base 5, the locking between the upper rail 8 and the lower rail 7 is released by means of the mechanical coupling, which is implemented, for example, by means of a Bowden cable. At the same time, the trigger mechanism is actuated and the memory module 15 is stopped on the lower rail 7 in the preset longitudinal seat position. The stopped position of the memory module 15 is fixed with respect to the lower rail 7 by a positive lock. Consequently, the preset comfort position is stored by the stopped position of the memory module 15 during a temporary longitudinal displacement of the vehicle seat 2, in particular for the purpose of entry or egress.

If the vehicle seat 2 is then moved back again, the memory module 15 is again received by the vehicle seat 2 in the preset longitudinal seat position by means of suitably configured coupling elements, the upper rail 8 being again locked to the lower rail 7 in the original position and the backrest 4 being folded back.

The operation and configuration of various coupling elements and units of the adjusting system 1 are described below with reference to FIGS. 2 to 6.

Figure 2:
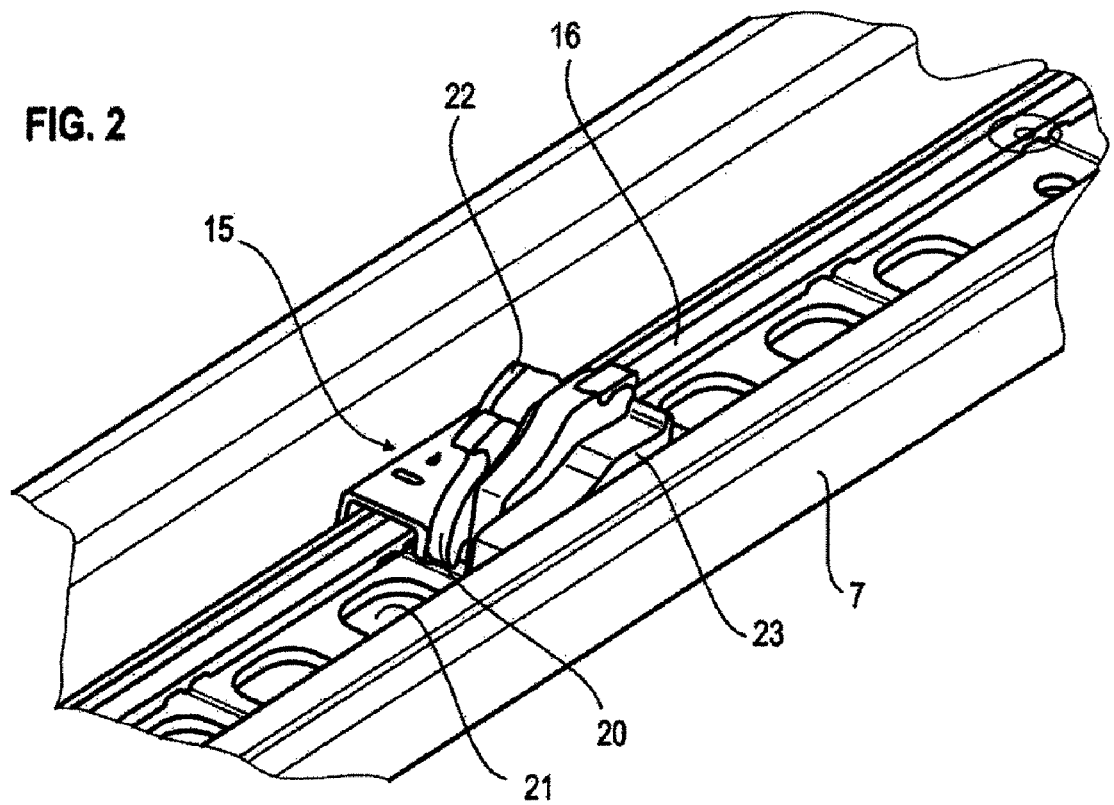
FIG. 2 is a perspective representation of a memory module on a lower rail mounted rigidly to the vehicle.

FIG. 2 shows in a perspective view the memory module 15 which is movable by means of a separate rail guide 16 along a lower rail 7 mounted rigidly to the vehicle. For adopting a fixed position with respect to the vehicle, the memory module 15 has a movable blocking catch 20 which forms a positive lock, by means of blocking lugs, with openings 21 arranged in the lower rail 7, or with the bridges located between the openings 21, at predetermined latching positions. To form the positive lock, the blocking catch 20 is moved by means of a control lever which is connected, for example, to the actuating lever 13 for folding the backrest 4 shown in FIG. 1. For this purpose the memory module 15 has a corresponding first control cam 22, along which the control lever of the vehicle seat 2 slides. In a fixed position of the seat, the control lever is at the same time seated in a recess of the control cam 22, which is indicated in FIG. 2 at the right-hand upper end of the memory module. Furthermore, in this position the blocking catch 20 is pressed into the position illustrated, in which it does not engage in the openings 21 of the lower rail 7. The memory module 15 then slides together with the vehicle seat 2 along the lower rail 7.

If the control lever is moved from its latching position along the first control cam 22 downwardly towards the left in FIG. 2, the front end in FIG. 2 of the blocking catch 20 is pressed downwards by a suitable mechanical preloading, for example a spring, in the direction of the openings 21 of the lower rail 7. At corresponding latching positions the blocking lugs of the blocking catch 20 are then moved into engagement with the openings 21, or the bridges located between them, so that the memory module 15 is then connected to the lower rail 7 in a fixed position with respect to the vehicle. The vehicle seat 2 then slides further with the upper rail 8, while the memory module 15 is stopped at the original longitudinal position of the seat. The preset longitudinal seat position is thereby stored mechanically.

It can also be seen in FIG. 2 that the memory module 15 has a second control cam 23 that is provided for controlling a blocking lever that is provided for blocking an actuating means for unlocking the locking device 17. This becomes apparent from the following figures.

Figure 3:
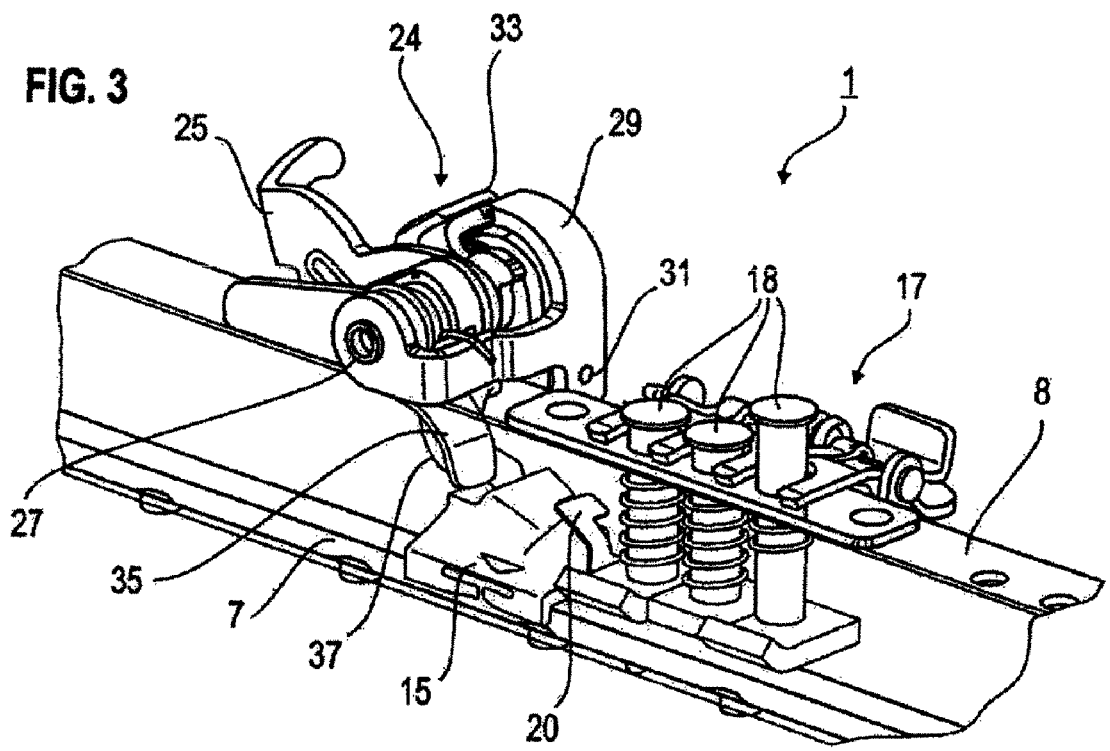
FIG. 3 shows in a partially transparent perspective representation an adjusting system for a vehicle seat with an "easy entry" function.

FIG. 3 shows in a partially-transparent perspective view the basic structure of an exemplary adjusting system 1 of a vehicle seat 2, as shown schematically in FIG. 1. As its basic elements the adjusting system 1 has the aforementioned memory module 15, the locking device 17 and a retaining device 24, which serves as a mounting on the seat for coupling elements which interact with the memory module 15. The memory module 15 is arranged displaceably on the lower rail 7 mounted rigidly to the vehicle. The retaining device 24 and the locking device 17 are mounted firmly to the upper rail 8 and are therefore fixed in relation to the seat. By means of the coupling elements, described in more detail below, which are arranged on the retaining device 24, the memory module 15 can be either stopped on the lower rail 7 in a fixed position with respect to the vehicle, or entrained with the upper rail 8 in a fixed position with respect to the seat.

The movable blocking catch 20 of the memory module 15, which cooperates with the coupling elements of the retaining device 24, can be seen in detail. It can also be seen that the locking device 17 has individual pins 18 which, upon corresponding positioning of the upper rail 8 with respect to the lower rail 7, lock said rails with respect to one another by passing through corresponding openings in both rails 7, 8.

Figure 4:
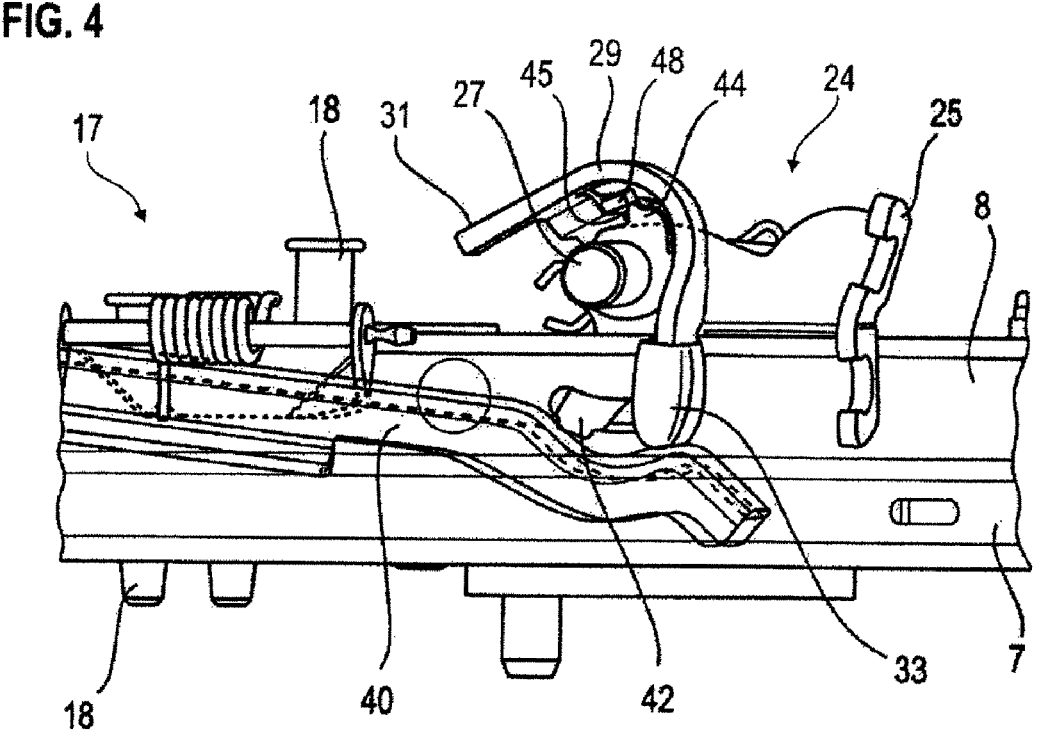
FIG. 4 shows in a detail view the actuating means of the adjusting system according to FIG. 3 acting on the locking device.
Figure 5:
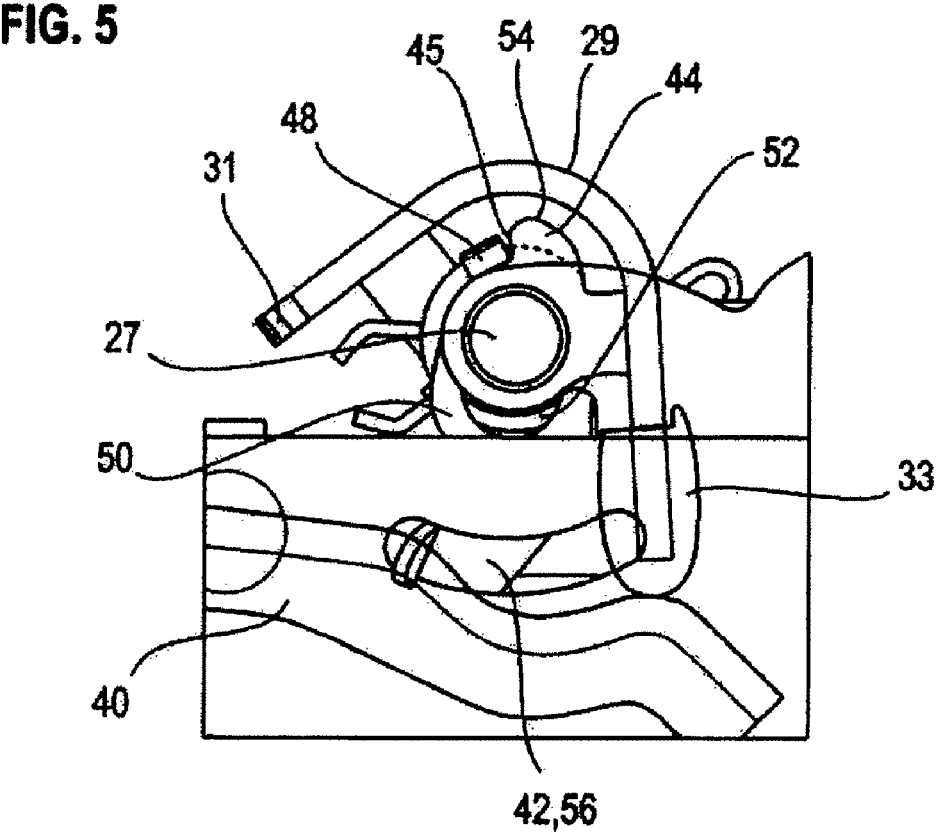
FIG. 5 shows in a further detail view the actuating means according to FIG. 4 in a blocked position.

The retaining device 24 comprises an angled retaining portion 25 which serves to guide and fix various mechanical coupling elements, such as, in particular, Bowden cables. An actuating means 29, which serves to unlock the locking device 17, is arranged rotatably on a spindle 27. An opening for insertion of the core of a Bowden cable can be seen on a free end 31 of the actuating means 29. For actuation, this Bowden cable is connected, for example, to the actuating lever 13 for folding the backrest 4 illustrated in FIG. 1. Arranged on the other end of the actuating means 29 is a coupling element 33 which—as can be seen in FIGS. 4 and 5—effects the unlocking of the locking device 17.

Also mounted rotatably on the spindle 27 of the retaining device 24 is a control lever 35 that is associated with the first control cam 22 of the memory module 15 shown in FIG. 2. This control lever 35 is used for stopping the memory module 15 on the lower rail 7, after actuation of the actuating mechanism for triggering the "easy entry" function. In the position illustrated, the control lever 35 presses on the left-hand upper end of the blocking catch 20, so that the memory module 15, attached to the retaining device 24, moves with the upper rail 8. Upon actuation of the "easy entry" actuating mechanism, for example the backrest-adjusting mechanism, the control lever 35 is moved anticlockwise. The blocking catch 20 latches on the openings 21, which can be seen in FIG. 2, or on the bridges located therebetween, so that the memory module 15 is then stopped on the lower rail 7 in a fixed position relative to the vehicle. The upper rail 8, with the retaining device 24 and the control lever 35, then slides onwards without the memory module 15.

A so-called comfort lever 37, that cooperates with the control ramp 23 of the memory module 15 visible in FIG. 2, is also mounted rotatably on the common spindle 27 of the retaining device 24. In the variant according to FIG. 3, a catch which locks the folded backrest 4 with respect to the seat base 5 is connected to this comfort lever 37. If the backrest 4 is folded forwards towards the seat base 5 after actuation of the actuating lever 13 for implementation of the "easy entry" function according to FIG. 1, the backrest 4 is latched with respect to the seat base 5 by means of this catch. At the same time, the memory module 15 is stopped on the lower rail 7 in a fixed position relative to the vehicle. The comfort lever 37 becomes freely movable; it is no longer coupled to the second control ramp 33 of the memory module 15.

As the vehicle seat 2 is moved back, the comfort lever 37 moves along the second control cam 23 of the memory module 15, whereby it is deflected on the common spindle 27 of the retaining device 24. This deflection of the comfort lever 37 is now utilized to unlock the catch between the backrest 4 and the seat base 5. The backrest 4 can now be folded up. The vehicle seat 2 is now again in the preset longitudinal seat position.

FIG. 4 now shows the adjusting system 1 according to FIG. 3 in a detail view from the side of the actuating means 29. In contrast to FIG. 3, however, the comfort lever 37 is now replaced by a blocking lever 42, which is also mounted on the common spindle 27. By means of this blocking lever 42 blocking of the actuating means 29 is effected, with the result that locking of the upper rail 8 to the lower rail 7 by means of the locking device 17 with a stopped memory module 15 is no longer possible.

It is first apparent from FIG. 4 that the actuating means 29, mounted rotatably on the spindle 27, acts on a free end of an actuating lever 40 by means of the coupling element 33. This actuating means 40 is preloaded mechanically against the coupling element 33 and effects, in a manner not represented in detail here, unlocking of the locking device 17 as shown in FIG. 3 by raising the pins 18. The actuating lever 40 may be considered, moreover, as a part of the actuating lever 10 of the vehicle seat according to FIG. 1. The locking device 17 is unlocked by raising the actuating lever 40 at the front end of the seat base 5.

In the position of the actuating means 29 shown in FIG. 4, the rear end of the actuating lever 40 is pressed downwards by means of the coupling element 33. The locking device 17 is unlocked. The vehicle seat 2 can be moved with the upper rail 8 along the lower rail 7 with the memory module 15 stopped. Without further measures, it can now happen that during this temporary displacement of the vehicle seat 2, that is, after utilization of the "easy entry" function, undesired re-locking between the upper rail 8 and the lower rail 7 takes place, depending on a position of the actuating lever 13 shown in FIG. 1 or depending on the inclined position of the backrest 4. This is because, depending on the rotational position of the actuating means 29, the actuating lever 40 will move to a position in which the pins 18 of the locking device 17 can again enter corresponding openings of the lower rail 7. They are released from the actuating lever 40.

To prevent this, the actuating means 29 has a catch hook 44 with a varying radial distance in the circumferential direction, which forms a retaining flank 45 on the side with the largest radial distance. A projection 48 formed in the axial direction, which interacts with the catch hook 44, is in turn associated with the blocking lever 42. In order to be able to run along the catch hook 44, the blocking lever 42 is mounted on the spindle 27 additionally with a translational degree of freedom.

If the actuating means 29, starting from a rest position in which the coupling element 33 is not in engagement with the actuating lever 40, is rotated anticlockwise as shown in FIG.

4, the axial projection 48 runs up the outer flank of the catch hook 44 with increasing radial distance from the spindle 27. In the position shown in FIG. 4, the axial projection 48 of the blocking lever 42 is still just retained by the catch hook 44, before moving radially inwards on the spindle 27, along the retaining flank 45, because of its preloading towards the second control cam 23. The actuating means 29 must now be moved by means of the "easy entry" actuating mechanism until the axial projection 48 of the blocking lever 42 moves beyond the retaining flank 45. Latching of the blocking lever 42 against the actuating means 29 configured as a rotary element then takes place.

To sum up, upon movement of the actuating means 29 in a clockwise direction, the blocking lever 42 is raised against the mechanical preload by means of the axial projection 48 which extends over the catch hook 44. Upon reaching the retaining flank 45, it is pulled downwards towards the memory module 15, whereby the projection 48 latches with respect to the retaining flank 45 of the actuating means 29. The actuating means 29 can then no longer be rotated back. It is supported against the axial projection 48 of the blocking lever 42 via the retaining flank 45.

This latched position can be seen in the detail view according to FIG. 5. As compared to FIG. 4, it is noted that the axial projection 48 of the blocking lever 42 has moved radially inwards with respect to the spindle 27. The retaining flank 45 of the catch hook 44 is in abutment with the projection 48. The run-up flank 54 of the catch hook 44 can also be clearly seen in this view. It is noted that the radial distance of the run-up flank 54 from the spindle 27 increases in the anticlockwise direction.

In the latched position illustrated, the actuating means 29 is blocked. The projection 48 of the blocking lever 42 prevents the actuating means 29 from rotating back anticlockwise. In this position the actuating lever 40 is pressed downwards by means of the coupling element 33, so that the locking device 17 is unlocked by raising of the pins 18. As long as the blocking lever 42 is displaced freely downwards as a result of its mechanical preload, locking of the upper rail 8 to the lower rail 7 is not possible.

The translational movement of the blocking lever 42 required for latching of the catch hook 44 with respect to the projection 48 is effected in that the blocking lever 42 has a bearing region 50 in which a slot 52 is formed. This slot 52 makes possible a movement of the blocking lever 42 in a translational direction—as shown in FIG. 5, this is a vertical direction. If the lower end of the blocking lever 42 is released after stoppage of the memory module 15, the latching between the actuating means 29 and the blocking lever 42 continues to exist. In other words, undesired locking between the upper rail 8 and the lower rail 7 is not possible after stoppage of the memory module 15.

If the vehicle seat 2, which has been temporarily displaced longitudinally, is moved back onto the stopped memory module 15, the blocking lever 42 again moves into interaction with the second control ramp 23 of the memory module 15. As it runs up on this control ramp 23, the blocking lever 42 is raised. The axial projection 48 is thereby raised in the radial direction along the retaining flank 45 beyond the catch hook 44. The latching between the actuating means 29 and the blocking lever 42 is cancelled. After the backrest 4 has been moved upright, or after actuation of the actuating lever 13 has ended, the actuating means 29 returns to the original position again. The coupling element 33 releases the actuating lever 40. After the memory module 15 has been run up upon, therefore, locking of the upper rail 8 to the lower rail 7 by means of the locking device 17 is again possible.

Figure 6:
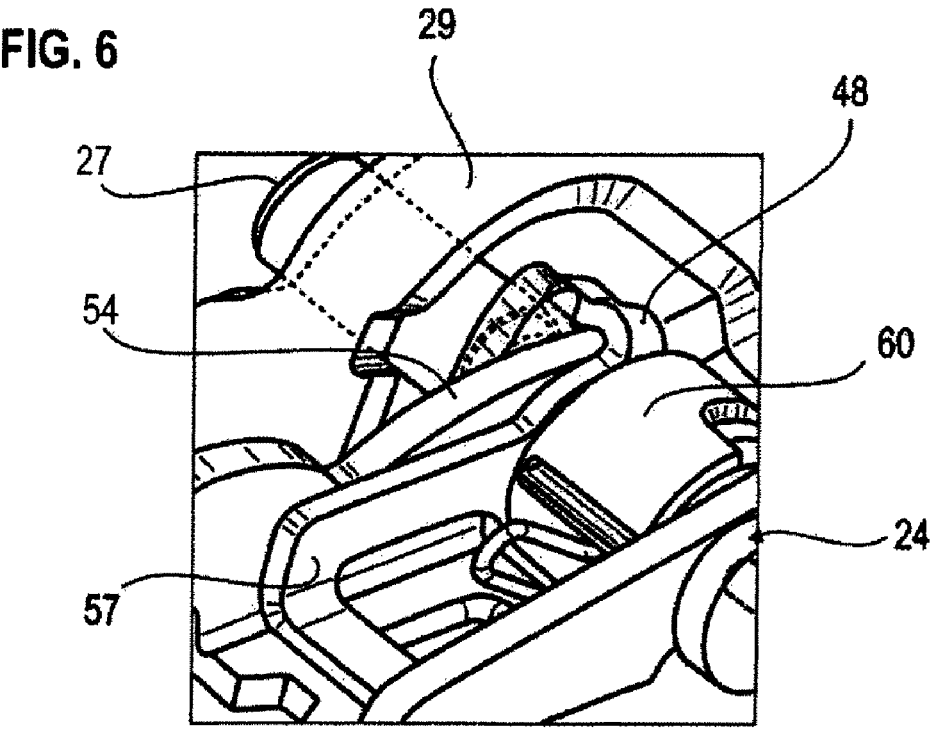
FIG. 6 shows in a further detail view the lever arm in the form of a bracing element of the blocking lever acting on the actuating means according to FIGS. 4 and 5.

Finally, in FIG. 6 the retaining device 24 is shown from above in a further detail view. The axial projection 48 of the blocking lever, which extends over the run-up flank 54 of the actuating means 29, can be clearly seen. A second lever arm 57 of the blocking lever 42, which forms a bracing element in conjunction with the mounting of the blocking lever 42 with a translational degree of freedom on the spindle 27, can also be seen. The first lever arm 56 of the blocking lever 42 can be seen in FIG. 5. The free end of the first lever arm 56 interacts directly with the second control cam 23 of the memory module 15.

The preloading device 60, that bears against the control lever 35, the blocking lever 42 and the actuating means 29 with a suitable mechanical preload, can also be seen in FIG. 6.

What is claimed is:

1. An adjusting system for a vehicle seat comprising
a lower rail that can be mounted rigidly to the vehicle,
an upper rail that is displaceable along the lower rail and is adapted to be mounted rigidly to the seat,
a locking device for locking the upper rail to the lower rail,
a memory module that is movable along the lower rail, is adapted to be fixed alternately with respect to the seat or to the vehicle, and includes a movable blocking catch for effecting positive locking to the lower rail,
a seat-mounted control lever for actuating the blocking catch,
a seat-mounted actuating mechanism for unlocking the locking device,
a seat-mounted blocking lever that engages in a position-dependent manner with the actuating mechanism,
wherein the memory module has a control cam for controlling the blocking lever such that, when the position of the memory module is fixed with respect to the vehicle, the actuating mechanism is blocked in an unlocking position by the blocking lever, and
wherein the control cam is movable with the memory module along the lower rail.

2. The adjusting system according to claim 1, wherein the actuating mechanism is adapted to be coupled to a backrest adjusting device.

3. The adjusting system according to claim 1, wherein a free end of the blocking lever is guided along the control cam of the memory module under preload.

4. The adjusting system according to claim 1,
wherein the actuating mechanism comprises a rotary element which, in a position in which it is rotated out from a rest position, causes unlocking of the locking device, and
wherein the rotary element is in the form of a rotatably mounted rocker, a free end of which rests against an actuating lever.

5. The adjusting system according to claim 4, wherein the rotary element comprises a first coupling mechanism and the blocking lever comprises a second coupling mechanism,
the first and second coupling mechanisms being coupled to one another in the rotated-out position of the rotary element when the blocking lever is free, and the coupling means being uncoupled when the blocking lever runs up on the control cam of the memory module.

6. The adjusting system according to claim 5,
wherein the first coupling means is formed on the rotary element as a radially outwardly-directed catch hook with a radial retaining flank,
wherein the second coupling means is formed on the blocking lever by an axial projection that rests against the catch hook, the projection extending behind the catch hook in the rotated-out position of the rotary element and being retained by the retaining flank, and the projection moving radially outwards along the retaining flank, the rotary element being thereby released, when the blocking lever runs up on the control cam of the memory module.

7. The adjusting system according to claim 4, wherein the blocking lever and the rotary element are mounted on a common spindle.

8. The adjusting system according to claim 7, wherein the blocking lever has a bearing region with a slot receiving the spindle, and has a first lever arm interacting with the control cam of the memory module and a second lever arm angled with respect to the first lever arm as a bracing element.

9. The adjusting system according to claim 1, wherein the actuating mechanism for unlocking the locking device further comprises an actuating lever.

10. The adjusting system according to claim 9, wherein the rotary element is in the form of a rotatably mounted rocker, a free end of which rests against the actuating lever.

11. The adjusting system according to claim 10, wherein the actuating lever is preloaded against the free end of the rocker.

12. A vehicle comprising an adjustment system for a vehicle seat according to claim 1.

* * * * *